(12) United States Patent
Schumacher et al.

(10) Patent No.: US 7,357,012 B2
(45) Date of Patent: Apr. 15, 2008

(54) METHODS AND ASSEMBLIES FOR BENDING STRANDS OF MATERIAL

(75) Inventors: David Robert Schumacher, Scotia, NY (US); John Robert Spriggle, Albany, NY (US); Steven Charles Walko, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 247 days.

(21) Appl. No.: 11/205,836

(22) Filed: Aug. 17, 2005

(65) Prior Publication Data

US 2007/0040302 A1 Feb. 22, 2007

(51) Int. Cl.
*B21D 7/00* (2006.01)

(52) U.S. Cl. ............................ 72/414; 140/92.1; 29/598

(58) Field of Classification Search ................ 72/414, 72/415, 411, 385; 140/123, 102, 102.5, 92.1; 29/598
See application file for complete search history.

(56) References Cited

U.S. PATENT DOCUMENTS

| | | | | |
|---|---|---|---|---|
| 64,585 | A * | 5/1867 | Schubeus ........................ 72/414 |
| 372,463 | A * | 11/1887 | Knapp ........................ 175/286 |
| 1,397,980 | A * | 11/1921 | Ouellette ........................ 72/415 |
| 1,721,636 | A * | 7/1929 | O'Brien ........................ 72/337 |
| 1,721,810 | A * | 7/1929 | Carter ........................ 72/362 |
| 1,931,242 | A * | 10/1933 | Ulrich ........................ 72/411 |
| 1,965,716 | A * | 7/1934 | Thoms et al. ................ 72/377 |
| 2,566,414 | A * | 9/1951 | Henry ........................ 72/362 |
| 2,814,222 | A * | 11/1957 | Sanders ................ 72/409.12 |
| 3,665,234 | A | 5/1972 | Bishop |
| 4,001,617 | A | 1/1977 | Boyer |
| 4,004,447 | A * | 1/1977 | Wantling ........................ 72/414 |
| 4,034,245 | A | 7/1977 | Mailfert et al. |
| 4,278,905 | A | 7/1981 | Chari et al. |
| 4,356,419 | A | 10/1982 | Boer et al. |
| 4,584,497 | A | 4/1986 | Butman, Jr. et al. |
| 4,624,124 | A * | 11/1986 | Reyes et al. ................ 72/403 |
| 5,760,516 | A | 6/1998 | Baumann et al. |
| 6,000,270 | A * | 12/1999 | Mullen ........................ 72/385 |
| 6,617,714 | B2 | 9/2003 | Laskaris |
| 6,645,416 | B2 | 11/2003 | Bock et al. |
| 6,897,593 | B1 | 5/2005 | Fletcher |

\* cited by examiner

*Primary Examiner*—Daniel C Crane
(74) *Attorney, Agent, or Firm*—Armstrong Teasdale LLP

(57) ABSTRACT

A method for bending strands of material. The method includes providing a first pair of opposing dies each comprising a first surface corresponding to a first pair of predetermined bends to be formed in a first strand of material, positioning the first strand of material at least partially between the first pair of opposing dies, moving the first pair of opposing dies with respect to one another to impart the first pair of predetermined bends in the first strand of material, providing a second pair of opposing dies each comprising a second surface corresponding to a second pair of predetermined bends to be formed in a second strand of material, positioning the second strand of material at least partially between the second pair of opposing dies, and moving the second pair of opposing dies with respect to one another to impart the second pair of predetermined bends in the second strand of material.

20 Claims, 13 Drawing Sheets

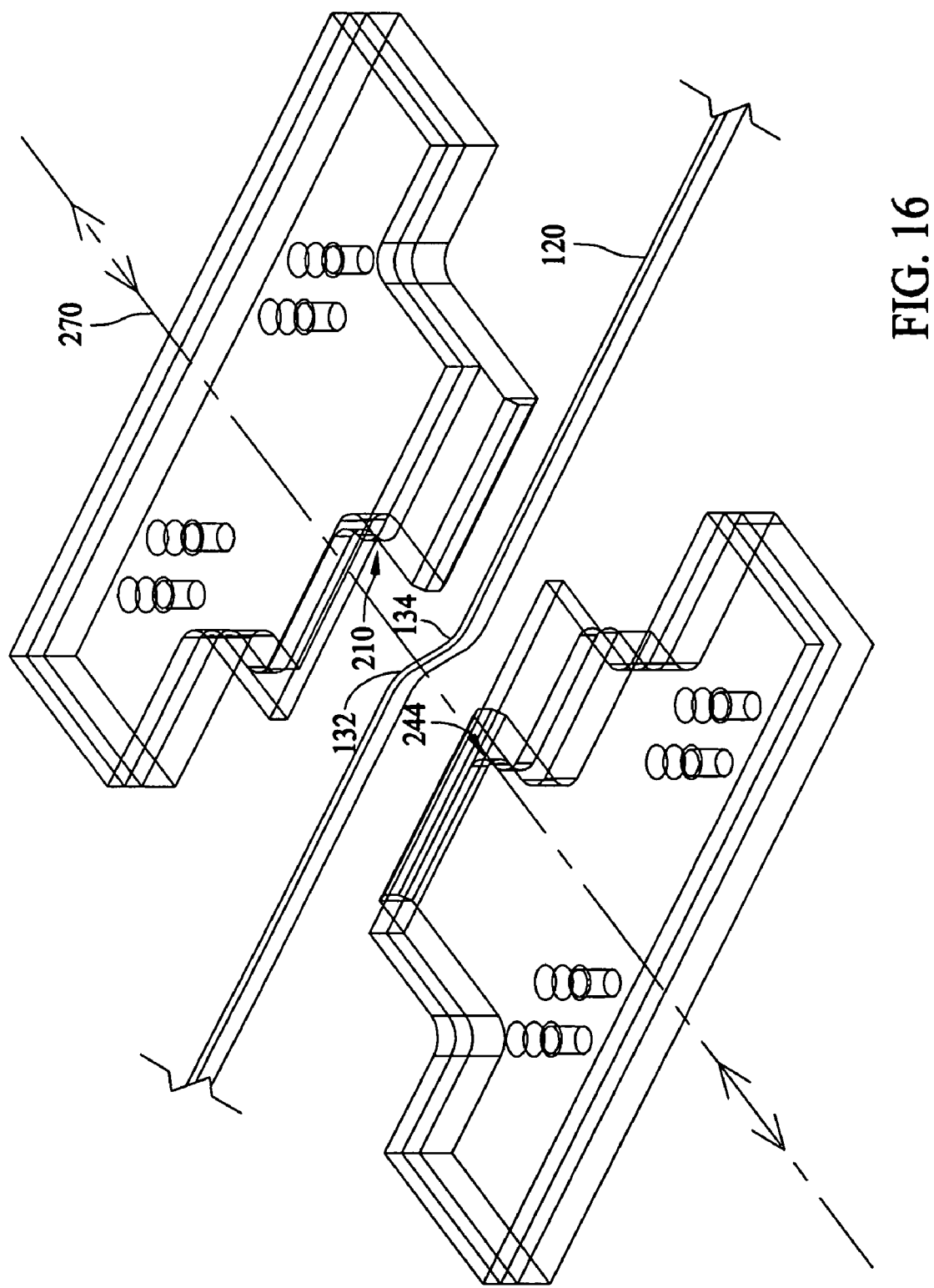

ent of a die of the exemplary assembly shown in FIG. 5.

METHODS AND ASSEMBLIES FOR BENDING STRANDS OF MATERIAL

BACKGROUND OF THE INVENTION

This invention relates generally to bending strands of material, and more specifically, for example, to methods and assemblies for fabricating stator for power generators.

In at least some known power generators, a stator yoke surrounds an armature core and partially encloses a plurality of armature windings, which are sometimes referred to as "stator windings" or "stator bars". At least some known stator bars include a plurality of strands of copper conductors that are wound in the armature to form loops. The armature windings are generally positioned to enable desired voltage and current characteristics to be generated during operation. Electrical insulation may be wrapped around the strands of copper conductor and/or the stator bars to separate the strands from each other and from other conductive structures.

At least some known methods for fabricating stator bars include using one or more assemblies to fabricate a plurality of strands from a coil of a copper conductor. For example, one or more assemblies may be used to uncoil, partially strip insulation from, bend, and cut the conductor to form a plurality of strands. Each formed strand may be bent at predetermined locations for winding around the armature bar, and after being cut to desired length, the plurality of strands may be combined to form a stator bar. Some known generators may include more than one configuration of stator bars and/or some assemblies used to fabricate stator bars may be used to fabricate differently-configured stator bars for different generators. Accordingly, the fabrication configuration of at least some known assemblies may be changed to enable bends to be formed at different locations, angles, and lengths for different stator bars. Moreover, at least some known assemblies use shims, spacers, and/or other fabrication devices to change a configuration of plates of the assembly to achieve the predetermined locations, angles, and lengths of the bends. To accurately configure the plates, a position of each of the shims, spacers, or other fabrication devices may be calculated based on the predetermined bends. However, accurately locating the shims, spacers, and/or other fabrication devices may be time-consuming and may be subject to operator error. As a result, poor reliability and/or repeatability of fabricating the finished stator bars, as well increased cycle times necessary between the fabrication of different stator bars, may contribute to decreasing an overall production rate of stator bars.

BRIEF DESCRIPTION OF THE INVENTION

In one aspect, a method is provided for bending strands of material. The method includes providing a first pair of opposing dies each comprising a first surface corresponding to a first pair of predetermined bends to be formed in a first strand of material, positioning the first strand of material at least partially between the first pair of opposing dies, moving the first pair of opposing dies with respect to one another to impart the first pair of predetermined bends in the first strand of material, providing a second pair of opposing dies each comprising a second surface corresponding to a second pair of predetermined bends to be formed in a second strand of material, positioning the second strand of material at least partially between the second pair of opposing dies, and moving the second pair of opposing dies with respect to one another to impart the second pair of predetermined bends in the second strand of material.

In another aspect, an assembly for bending a strand of material includes a first tool and a second tool. The first tool includes a first die coupled to the first tool. The first die includes a first surface corresponding to a first predetermined bend to be formed in the strand of material. The first surface is fixedly secured with respect to the first tool. The second tool includes a second die coupled to the second tool. The second die includes a second surface corresponding to a second predetermined bend to be formed in the strand of material. The second surface is fixedly secured with respect to the second tool. The first surface is configured to impart the first predetermined bend in the strand of material and the second surface is configured to impart the second predetermined bend in the strand of material when the strand of material is positioned at least partially between the first and second surfaces and when the first and second tools are moved relative to one another along an axis of motion.

In yet another aspect, an assembly for bending a strand of material includes a first tool and a second tool. The first tool includes a first die coupled to the first tool. The first die includes a first surface corresponding to a first predetermined bend to be formed in the strand of material. The first surface is fixedly secured with respect to a distance from an axis of motion of the first and second tools. The second tool is aligned with the first tool along the axis of motion. The second tool includes a second die coupled the second tool. The second die includes a second surface corresponding to a second predetermined bend to be formed in the strand of material. The second surface is fixedly secured with respect to the axis of motion. The first surface is configured to impart the first predetermined bend in the strand of material and the second surface configured to impart the second predetermined bend in the strand of material when the strand of material is positioned at least partially between the first and second surfaces and when the first and second tools are moved relative to one another along the axis of motion.

BRIEF DESCRIPTION OF THE DRAWINGS

FIG. 16 is a perspective view of an exemplary embodiment of a pair of opposing dies of the exemplary assembly shown in FIG. 5.

DETAILED DESCRIPTION OF THE INVENTION

Figure 1:
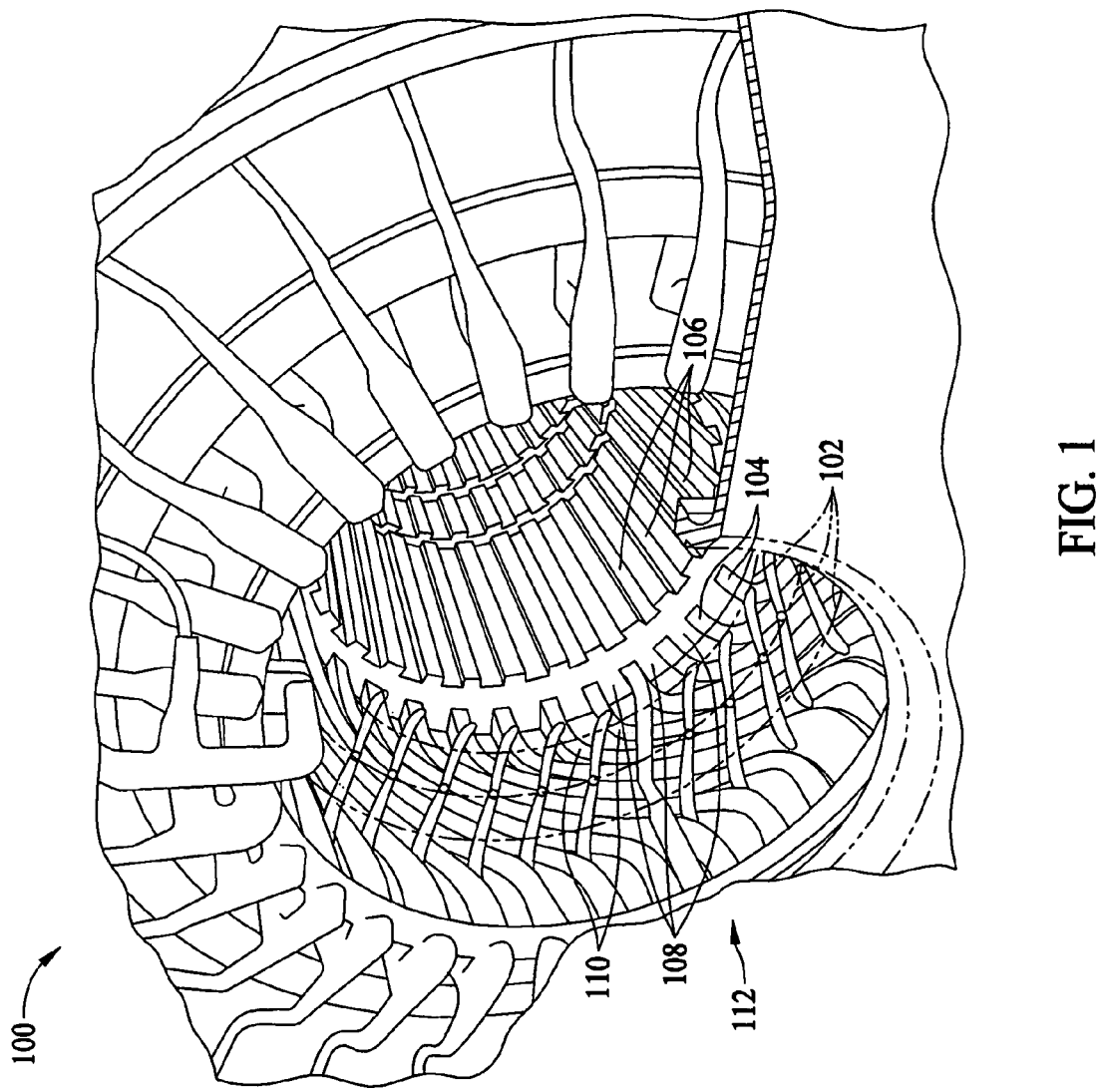
FIG. 1 is a perspective end view of an exemplary generator.

FIG. 1 is a perspective end view of an exemplary generator 100. A rotor 102 is transparently represented by dashed lines. A plurality of stator bars 104 are positioned in slots 106 defined around an inner circumference of a stator core 108. Each stator bar 104 includes at least one circumferential bend 110 defined between a turbine end 112 and a generator end (not shown) of each bar 104.

Figure 2:
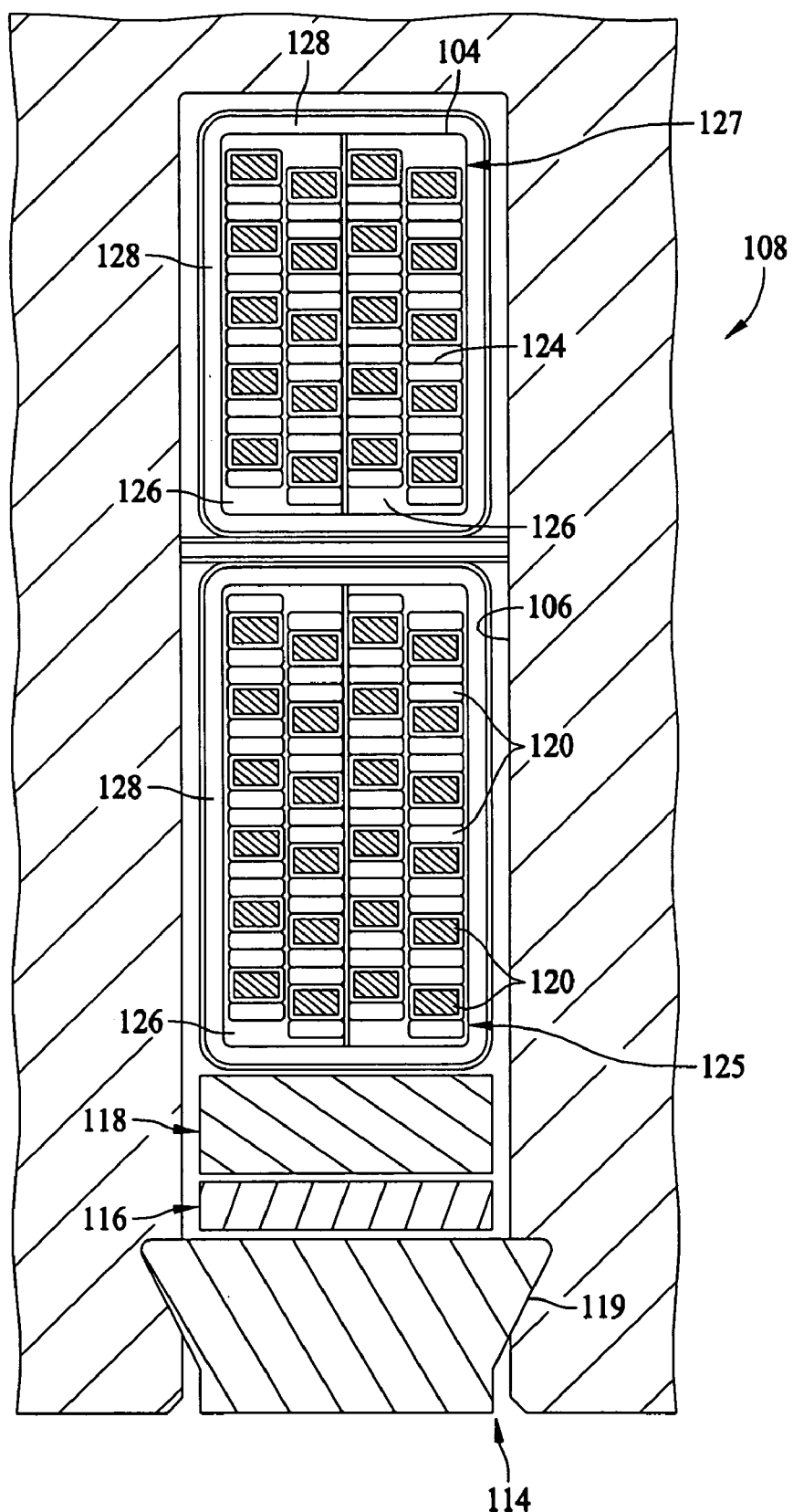
FIG. 2 is a partial cross-section of an exemplary stator core of the exemplary generator shown in FIG. 1.

FIG. 2 is a partial cross-section of exemplary stator core 108. Stator core 108 includes slots 106 (only one is illustrated) that each include an access opening 114, and a dovetail slot 116 that is adjacent opening 114 and extends generally along slots 106. In the exemplary embodiment, stator bars 104 are mounted in each of slots 106 with one or more filler elements 118 at opening 114. A dovetail shaped wedge 119 is positioned at least partially within dovetail slot 116 to apply a radially outward force on filler elements 118, which in turn apply a radially outward force to stator bars 104 to retain stator bars 104 within slots 106.

In the exemplary embodiment, stator bars 104 are formed of a plurality of strands 120 of a conducting material that are bundled together prior to form to a predetermined winding path through stator bar 104. Although strands 120 may be fabricated from any material, in some embodiments strands 120 include a copper conductor. In some embodiments, strands 120 may be cooled. Strands 120 may be cooled in any suitable manner, fashion, and/or by any suitable means. For example, in some embodiments strands 120 are cooled by passing a fluid, such as, but not limited to, air and/or hydrogen gas, over strands 120. Moreover, and for example, in some embodiments some or all of strands 120 are hollow cooling strands 120 that channel a fluid, such as, but not limited to, water, an oil, air, and/or hydrogen gas, for cooling strands 120. In the exemplary embodiment shown in FIG. 2, some of strands 120 are shown as hollow and some of strands 120 are shown as solid. Another example of cooling of strands 120 includes indirect cooling of strands 120, for example by passing a fluid, such as, but not limited to, air and/or hydrogen gas, over stator core 108 to thereby cool strands 120 through conduction between stator core 108 and strands 120.

Adjacent strands 120 may be electrically-insulated from each other by an enamel material 124. Transportation putty material 126 may surround radially inward portions 125 and/or radially outward portions 127 of strands 120 within slots 106. Each stator bar 104 may be surrounded by multiple layers of an electrical insulation 128, also known as ground wall insulation. The number of layers of insulation 128 and their particular arrangement are variably selectable based upon a design specification for generator 100.

Figure 3:
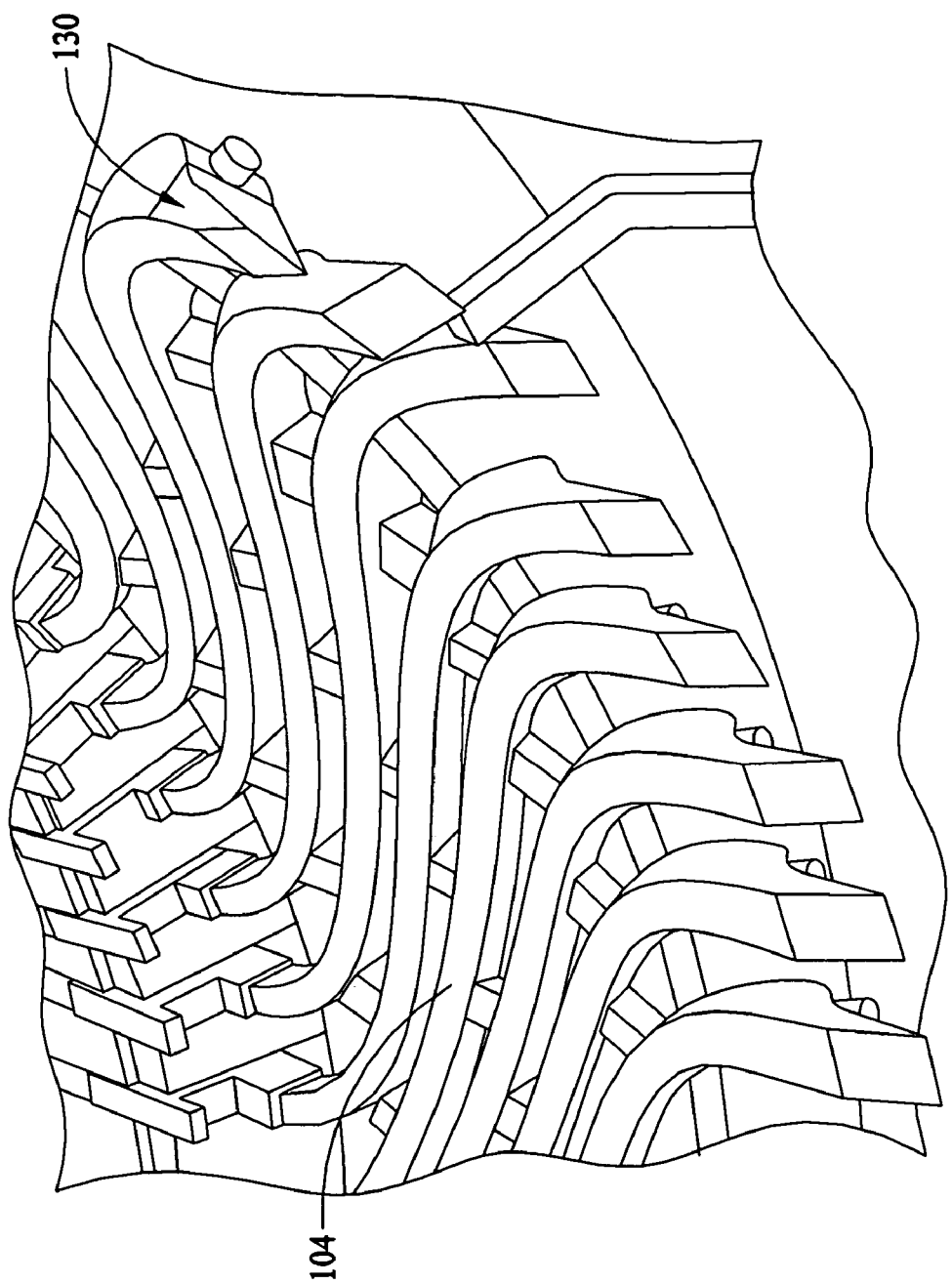
FIG. 3 is a perspective view of exemplary stator bar windings of the exemplary generator shown in FIG. 1.

Although insulation 128 may include other insulation (e.g., extruded insulation), in the exemplary embodiment insulation 128 is fabricated from mica-based materials which include a binder. In some embodiments, insulation 128 may initially be flexible enough to be wound or wrapped around strands 120, but after curing, may be relatively hard. FIG. 3 is a perspective view of exemplary stator bars 104. Ends 130 of each of strands 120 are electrically connected together to form each stator bar 104 of generator 100. In some embodiments, ends 130 may not include insulation, but rather may remain exposed.

Figure 4:
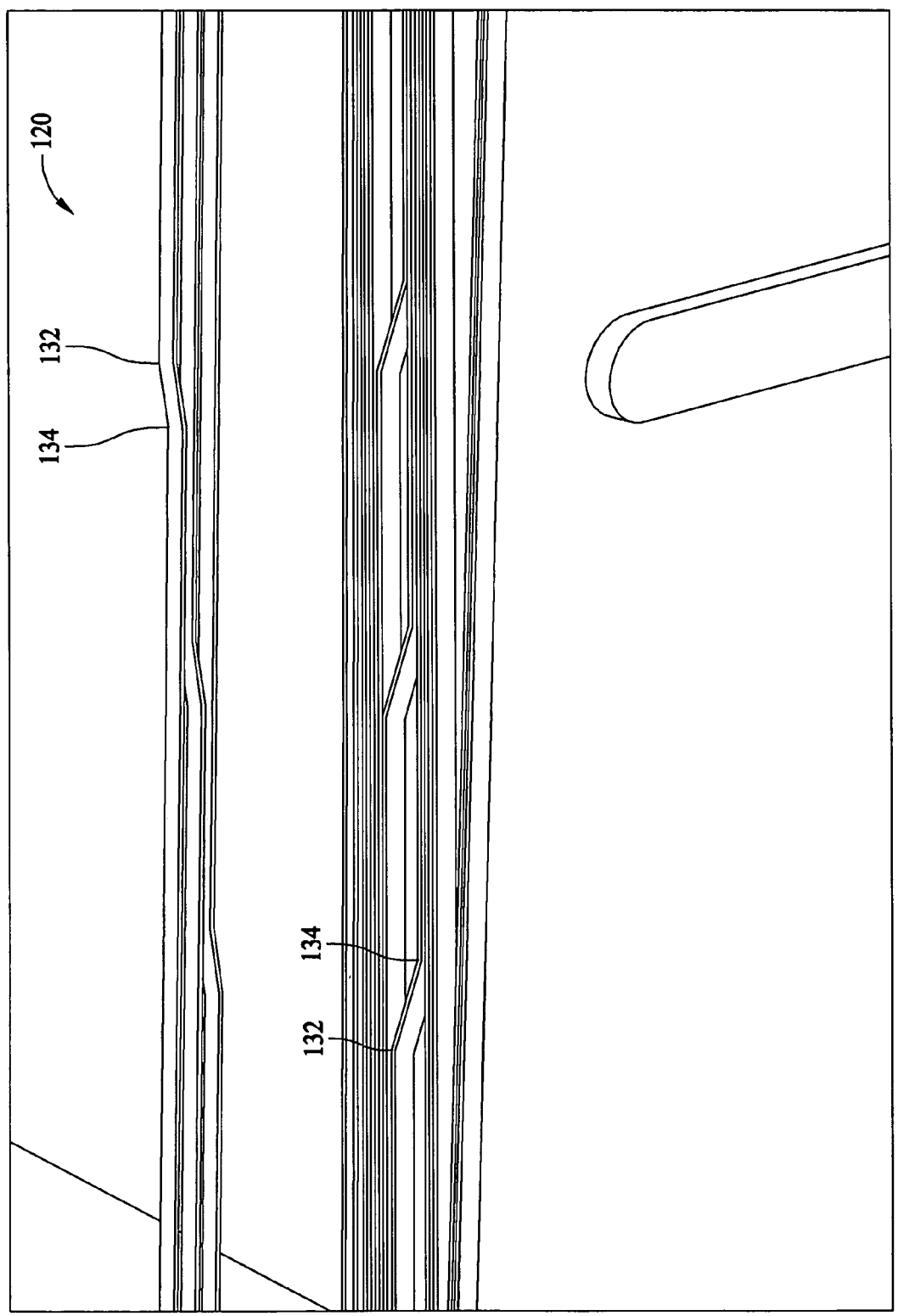
FIG. 4 is a perspective view of exemplary strands of material.

Although strands 120 may have any shape, in the exemplary embodiment strands 120 are generally rectangular in cross section. FIG. 4 illustrates exemplary strands 120. Strands 120 may each include one or more predetermined bends for, for example, bundling (e.g., weaving) strands 120 together to form a stator bar 104 and/or forming a finished shape (e.g., circumferential bend 110, shown in FIGS. 1 and 3) of a stator bar 104. Strands 120 may each include any number of bends. As shown in FIG. 4, in the exemplary embodiment strands 120 each include two predetermined bends 132 and 134 for weaving strands 120 together to form a stator bar 104.

Figure 5:
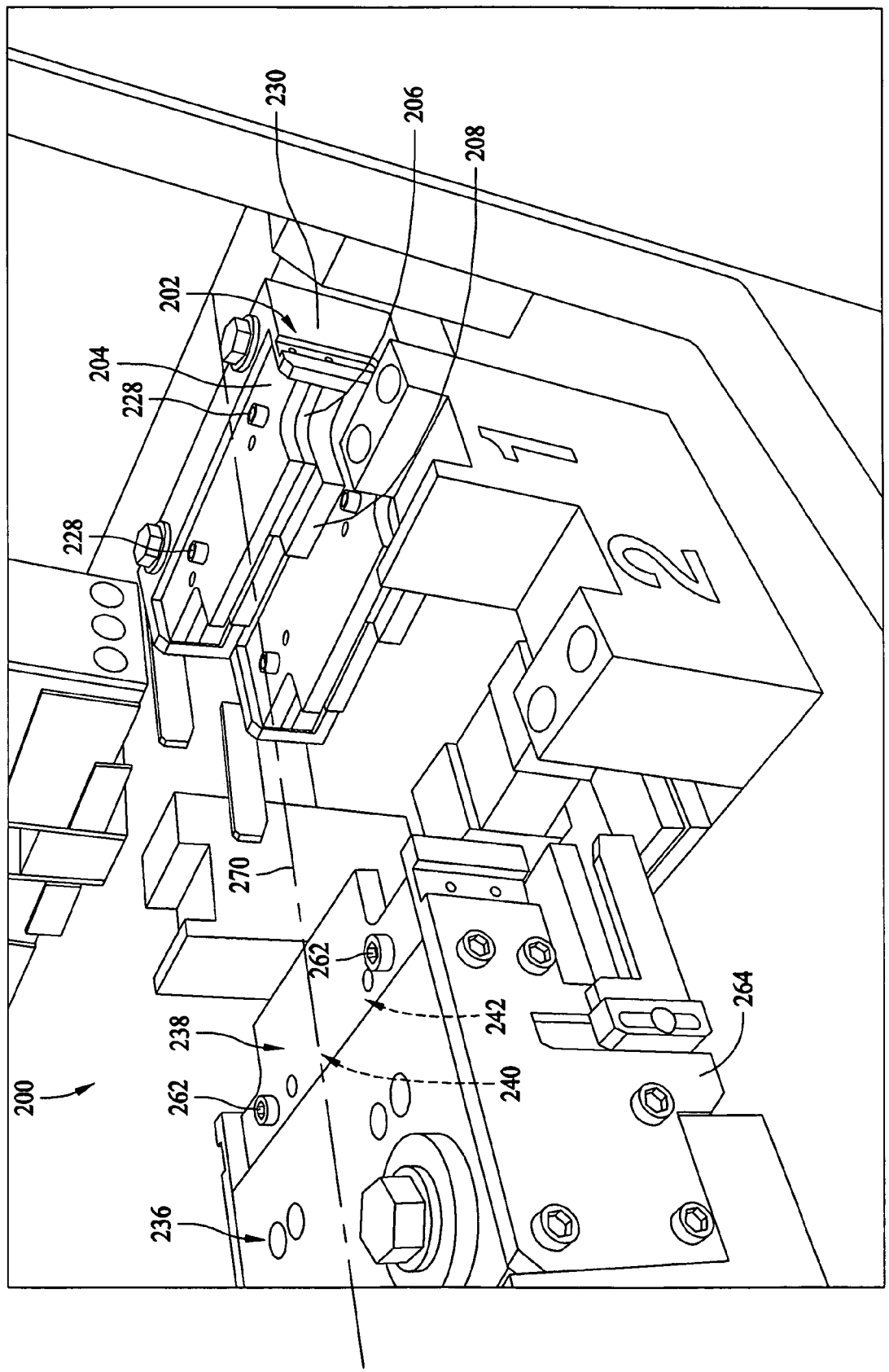
FIG. 5 is a perspective view of an exemplary embodiment of an assembly for bending the exemplary strand of material shown in FIG. 4.

FIG. 5 is a perspective view of an exemplary embodiment of an assembly 200 for bending strands 120 (FIG. 4). Although assembly 200 may be used to impart any type and/or configuration of bend, for example bends of any location, length, and/or angle, in strands 120, in the exemplary embodiment described and illustrated herein assembly 200 is configured to impart the predetermined bends 132 and 134 (FIG. 4) in strands 120. Assembly 200 includes a tool 202, an upper retaining member 204 coupled to tool 202, a die 206 coupled to tool 202, and a lower retaining member 208 coupled to tool 202. In the exemplary embodiment, die 206 is coupled to tool 202 at least partially between upper retaining member 204 and lower retaining member 208.

Figure 6:
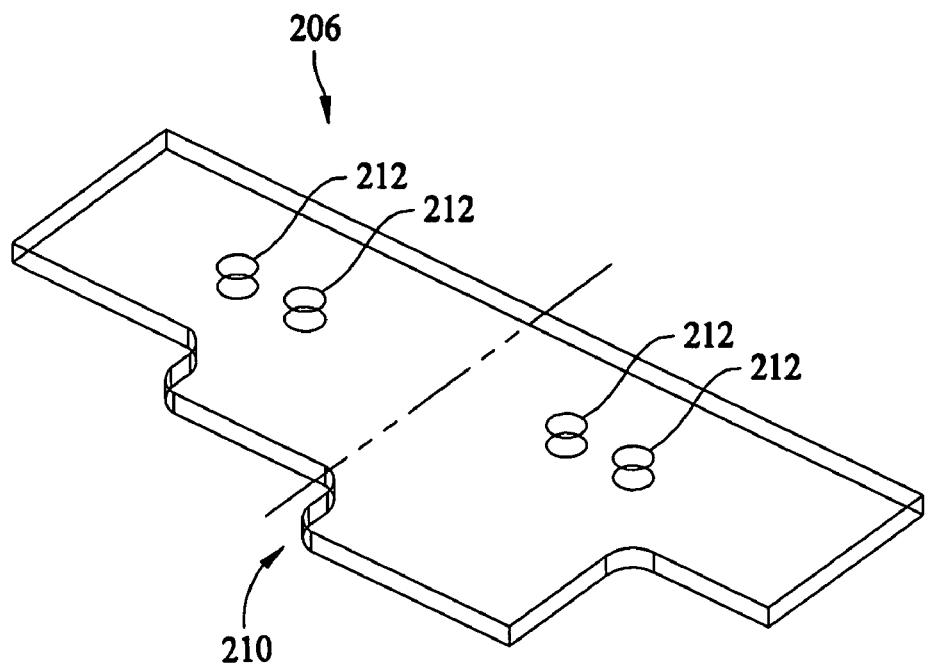
FIG. 6 is a perspective view of an exemplary embodiment of a die of the exemplary assembly shown in FIG. 5.

FIG. 6 is a perspective view of the exemplary embodiment of die 206. Die 206 includes a surface 210 corresponding to predetermined bend 134 (FIG. 4) in strands 120 (FIG. 3). More specifically, surface 210 is sized and shaped to impart predetermined bend 134 in a strand 120 when a portion of the strand 120 is pressed against surface 210. Although in the exemplary embodiment surface 210 corresponds to predetermined bend 134, and more specifically surface 210 is sized, shaped, and located on die 206 to impart predetermined bend 134 in strands 120, surface 210 may correspond to any configuration and/or type of bend (e.g., bends of any location, length and/or angle), whether described and/or illustrated herein. Die 206 may couple to tool 202 in any suitable manner, fashion, arrangement, and/or configuration. In the exemplary embodiment, die 206 includes a plurality of holes 212 for receiving fasteners (not shown in FIG. 6) for fixedly securing die 206 to tool 202. As can be seen from FIG. 6, in the exemplary embodiment die 206 is a unitary body wherein surface 210 is fixed in location with respect to other portions of die 206.

Figure 7:
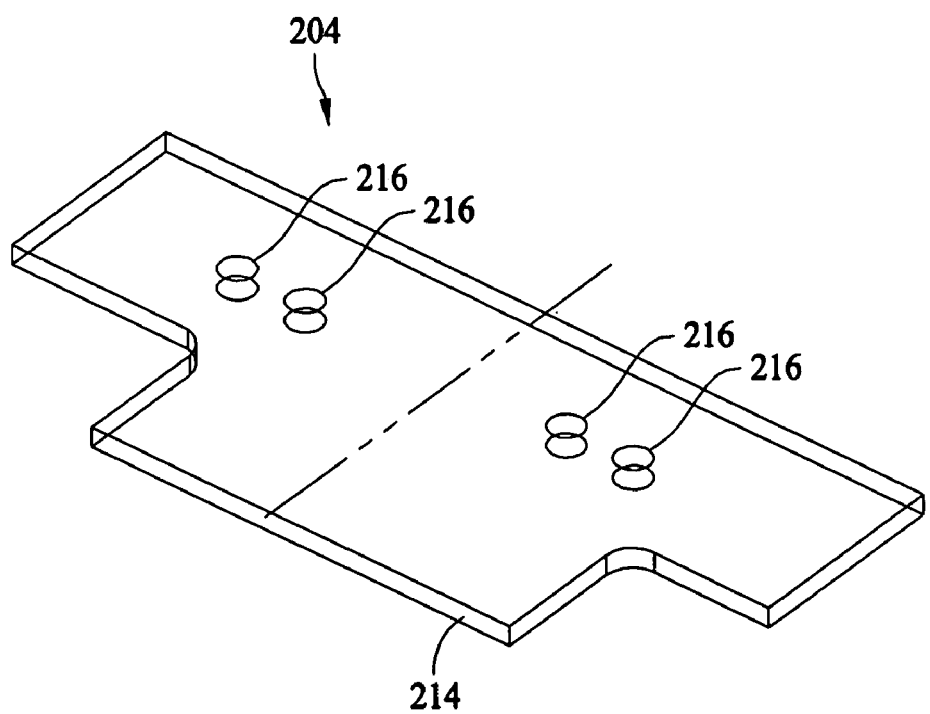
FIG. 7 is a perspective view of an exemplary embodiment of an upper retaining member of the exemplary assembly shown in FIG. 5.

FIG. 7 is a perspective view of the exemplary embodiment of upper retaining member 204 of assembly 200. Upper retaining member 204 includes an extension 214 for facilitating maintaining a strand 120 (FIG. 4) adjacent surface 210 (FIG. 6) of die 206 (FIG. 6), as will be described in more detail below. Upper retaining member 204 may couple to tool 202 (FIG. 5) in any suitable manner, fashion, arrangement, and/or configuration. In the exemplary embodiment, upper retaining member 204 includes a plurality of holes 216 for receiving fasteners (not shown in FIG. 7) for fixedly securing upper retaining member 204 to tool 202. In the exemplary embodiment, holes 216 communicate with holes 212 within die 206 for receiving the same fasteners as die 206.

Figure 8:
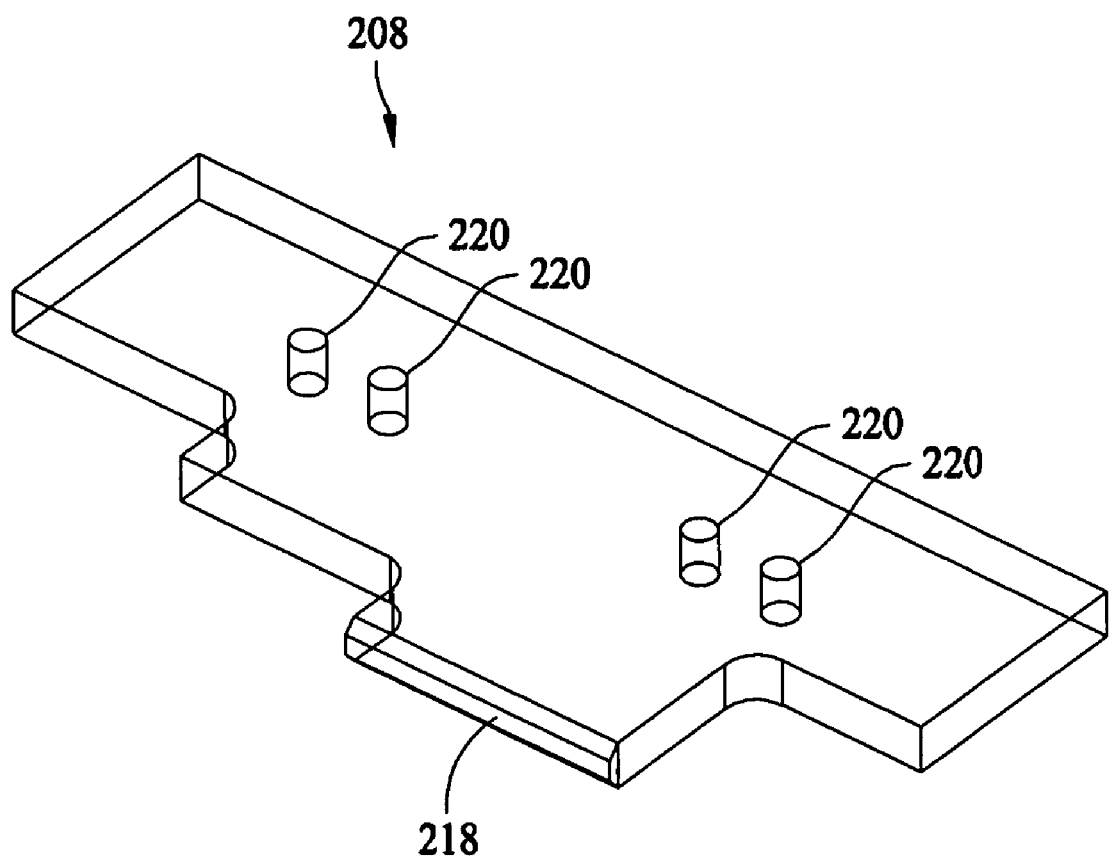
FIG. 8 is a perspective view of an exemplary embodiment of a lower retaining member of the exemplary assembly shown in FIG. 5.

FIG. 8 is a perspective view of the exemplary embodiment of lower retaining member 208 of assembly 200. Lower retaining member 208 includes an extension 218 for facilitating maintaining a strand 120 (FIG. 4) adjacent surface 210 of die 206, as will be described in more detail below. Lower retaining member 208 may couple to tool 202 (FIG. 5) in any suitable manner, fashion, arrangement, and/or configuration. In the exemplary embodiment, lower retaining member 208 includes a plurality of holes 220 for receiving fasteners (not shown in FIG. 8) for fixedly securing lower retaining member 208 to tool 202. In the exemplary embodiment, holes 220 communicate with holes 212 within die 206 and holes 216 within upper retaining member 204 for receiving the same fasteners as die 206 and upper retaining member 204.

Figure 9:
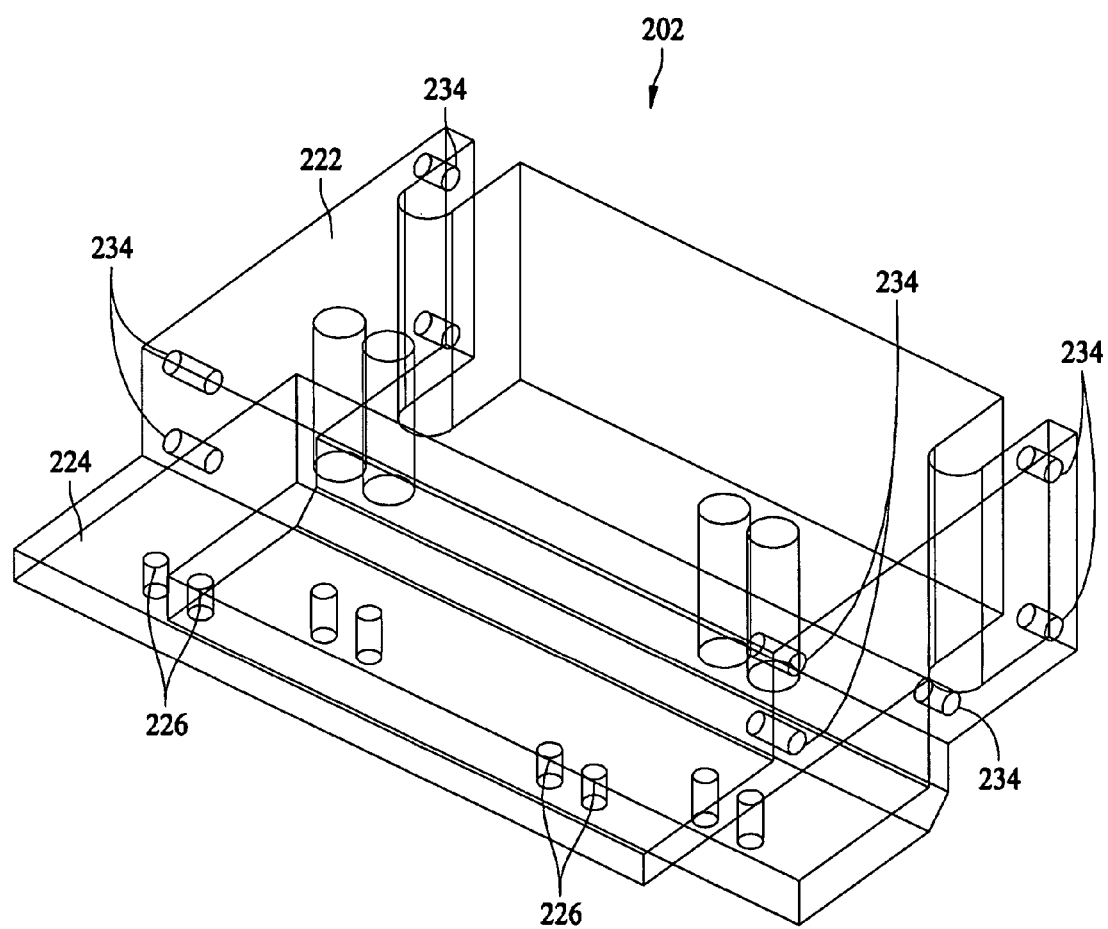
FIG. 9 is a perspective view of an exemplary embodiment of a tool of the exemplary assembly shown in FIG. 5.

FIG. 9 is a perspective view of the exemplary embodiment of tool 202. Tool 202 includes a body 222 having a surface 224 for coupling upper retaining member 204 (FIG. 7), die 206 (FIG. 6), and lower retaining member 208 (FIG. 8) thereto. Upper retaining member 204, die 206, and lower retaining member 208 may couple to tool 202 in any suitable manner, fashion, arrangement, and/or configuration. In the exemplary embodiment, tool 202 includes a plurality of holes 226 for receiving fasteners 228 (shown in FIG. 5) for fixedly securing upper retaining member 204, die 206, and lower retaining member 208 to tool 202. In the exemplary embodiment, holes 226 communicate with holes 212 (FIG. 6) within die 206, holes 216 (FIG. 7) within upper retaining member 204, and holes 220 (FIG. 8) within lower retaining member 208 for receiving fasteners 228. Although fasteners 228 may be any type of fasteners, in the exemplary embodiment fasteners 228 are threaded fasteners. In some embodiments, holes 212, holes 216, holes 220, and/or holes 226 are threaded for threaded connection to fasteners 228. In some embodiments, each of fasteners 228 are thread ably connected to a nut (not shown) for coupling upper retaining member 204, die 206, and lower retaining member 208 to tool 202. When die 206 is coupled to tool 202, die 206, and therefore surface 210 (FIG. 6), is fixedly secured (e.g., fixed in location) with respect to tool 202.

Figure 10:
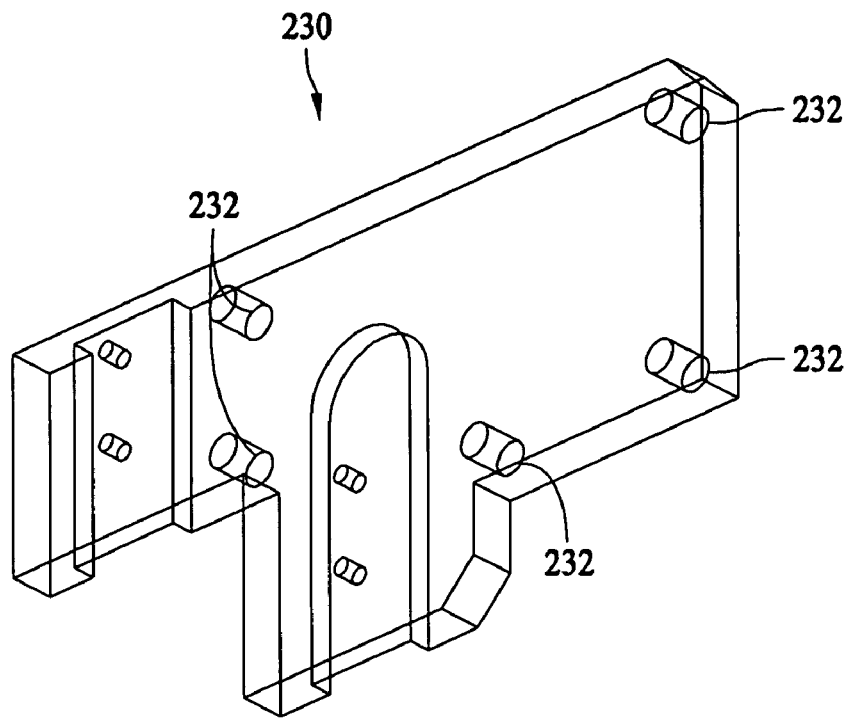
FIG. 10 is a perspective view of an exemplary embodiment of an end plate of the exemplary assembly shown in FIG. 5.

Tool 202 may also include one or more end plates 230 coupled to tool 202, an exemplary embodiment of which is shown in FIGS. 5 and 10. End plates 230 may couple to tool 202 in any suitable manner, fashion, arrangement, and/or configuration. In the exemplary embodiment, each end plate 230 includes a plurality of holes 232 for receiving fasteners (not shown) for fixedly securing end plates 230 to tool 202. Holes 232 may communicate with a plurality of holes 234 (FIG. 9) within tool 202 for receiving the same fasteners as holes 234 for coupling end plates 230 to tool 202. Although the fasteners may be any type of fasteners, in the exemplary embodiment the fasteners are threaded fasteners. In some embodiments, holes 232 and/or holes 234 are threaded for threaded connection to the fasteners. In some embodiments, each of the fasteners is thread ably connected to a nut (not shown) for coupling end plates 230 to tool 202.

Referring again to FIG. 9, tool 202 may be coupled to an actuator (not shown) for moving tool 202 to impart predetermined bend 134 into strands 120 (FIG. 4), as will be described in more detail below. Although the actuator may move tool 202 in any suitable fashion, manner, and/or by any means, in some embodiments tool 202 is moved using hydraulic power, pneumatic power, and/or electrical power.

Referring again to FIG. 5, assembly 200 also includes a tool 236, an upper retaining member 238 coupled to tool 236, a die 240 coupled to tool 236, and a lower retaining member 242 coupled to tool 236. In the exemplary embodiment, die 240 is coupled to tool 236 at least partially between upper retaining member 238 and lower retaining member 242.

Figure 11:
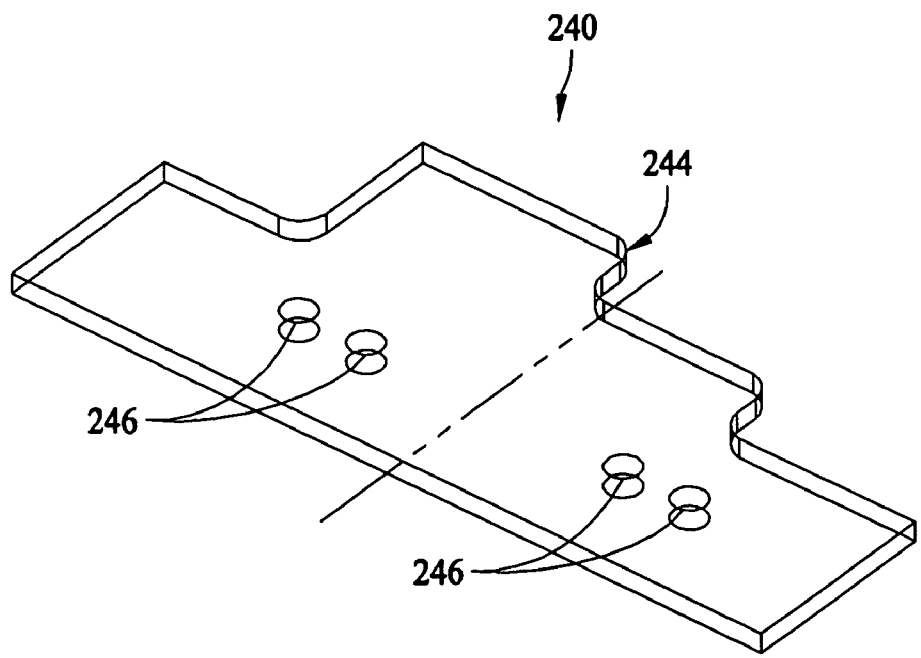
FIG. 11 is a perspective view of an exemplary embodi-

FIG. 11 is a perspective view of the exemplary embodiment of die 240. Die 240 includes a surface 244 corresponding to predetermined bend 132 (FIG. 4) in strands 120 (FIG. 3). More specifically, surface 244 is sized and shaped to impart predetermined bend 132 in a strand 120 when a portion of the strand 120 is pressed against surface 244. Although in the exemplary embodiment surface 244 corresponds to predetermined bend 132, and more specifically surface 244 is sized, shaped, and located on die 240 to impart predetermined bend 132 in strands 120, surface 244 may correspond to any configuration and/or type of bend (e.g., bends of any location, length and/or angle), whether described and/or illustrated herein. In the exemplary embodiment, die 240 is shaped generally identically to die 206, such that surface 244 of die 240 is shaped generally identically to surface 210 of die 206. In some embodiments, die 240 or surface 244 of die 240 is not shaped generally identically to die 206 or surface 210 of die 206. Die 240 may couple to tool 236 in any suitable manner, fashion, arrangement, and/or configuration. In the exemplary embodiment, die 240 includes a plurality of holes 246 for receiving fasteners (not shown in FIG. 6) for fixedly securing die 240 to tool 236. As can be seen from FIG. 6, in the exemplary embodiment die 240 is a unitary body wherein surface 244 is fixed in location with respect to other portions of die 240.

Figure 12:
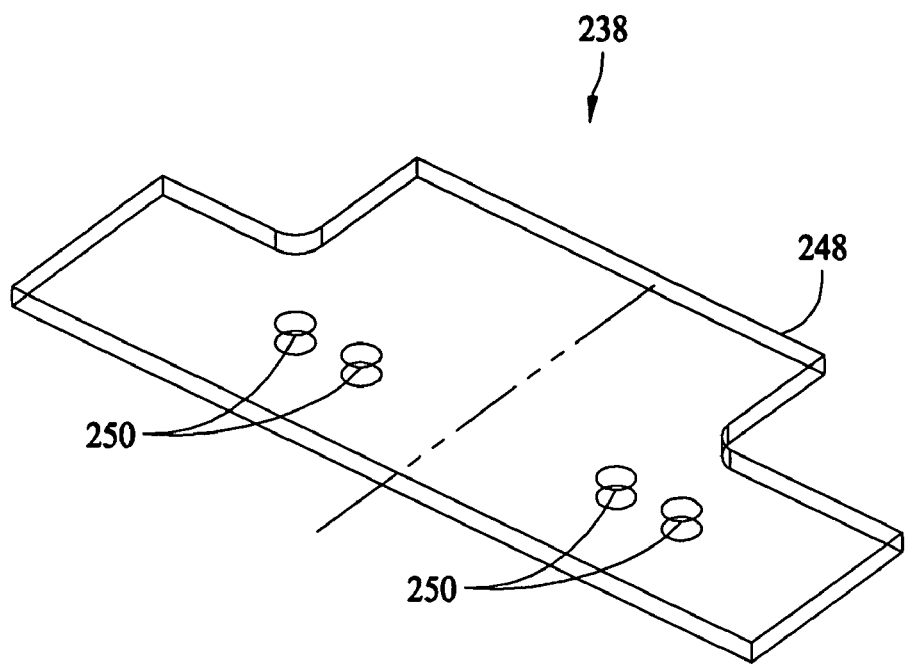
FIG. 12 is a perspective view of an exemplary embodiment of an upper retaining member of the exemplary assembly shown in FIG. 5.

FIG. 12 is a perspective view of the exemplary embodiment of upper retaining member 238 of assembly 200. Upper retaining member 238 includes an extension 248 for facilitating maintaining a strand 120 (FIG. 4) adjacent surface 244 (FIG. 11) of die 240 (FIG. 11), as will be described in more detail below. Upper retaining member 238 may couple to tool 236 (FIG. 5) in any suitable manner, fashion, arrangement, and/or configuration. In the exemplary embodiment, upper retaining member 238 includes a plurality of holes 250 for receiving fasteners (not shown in FIG. 12) for fixedly securing upper retaining member 238 to tool 236. In the exemplary embodiment, holes 250 communicate with holes 246 within die 240 for receiving the same fasteners as die 240.

Figure 13:
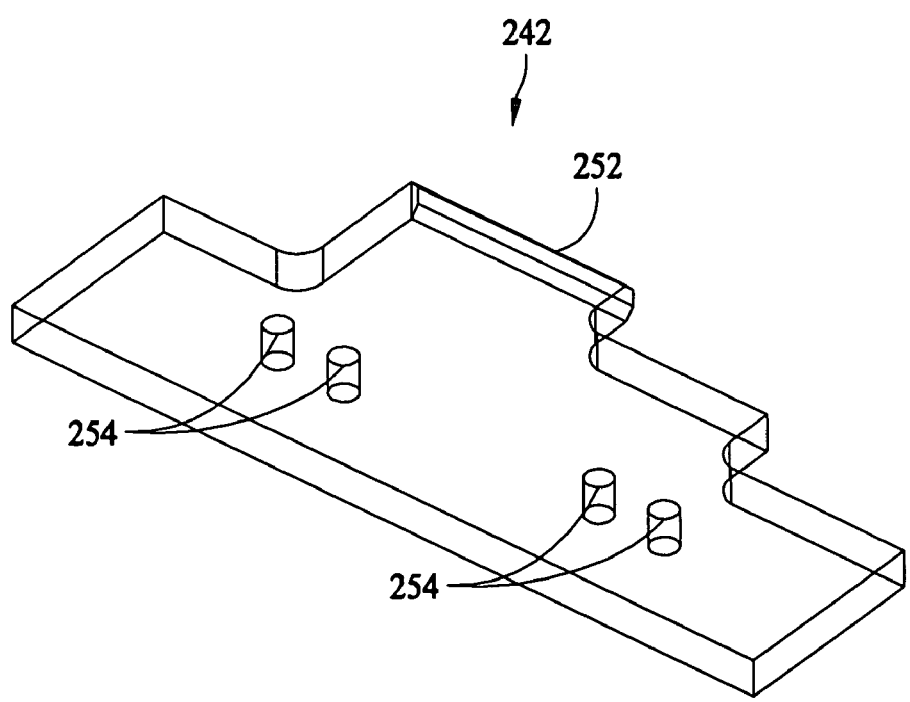
FIG. 13 is a perspective view of an exemplary embodiment of a lower retaining member of the exemplary assembly shown in FIG. 5.

FIG. 13 is a perspective view of the exemplary embodiment of lower retaining member 242 of assembly 200. Lower retaining member 242 includes an extension 252 for facilitating maintaining a strand 120 (FIG. 4) adjacent surface 244 of die 240, as will be described in more detail below. Lower retaining member 242 may couple to tool 236 (FIG. 5) in any suitable manner, fashion, arrangement, and/or configuration. In the exemplary embodiment, lower retaining member 242 includes a plurality of holes 254 for receiving fasteners (not shown in FIG. 13) for fixedly securing lower retaining member 242 to tool 236. In the exemplary embodiment, holes 254 communicate with holes 246 within die 240 and holes 250 within upper retaining member 238 for receiving the same fasteners as die 240 and upper retaining member 238.

Figure 14:
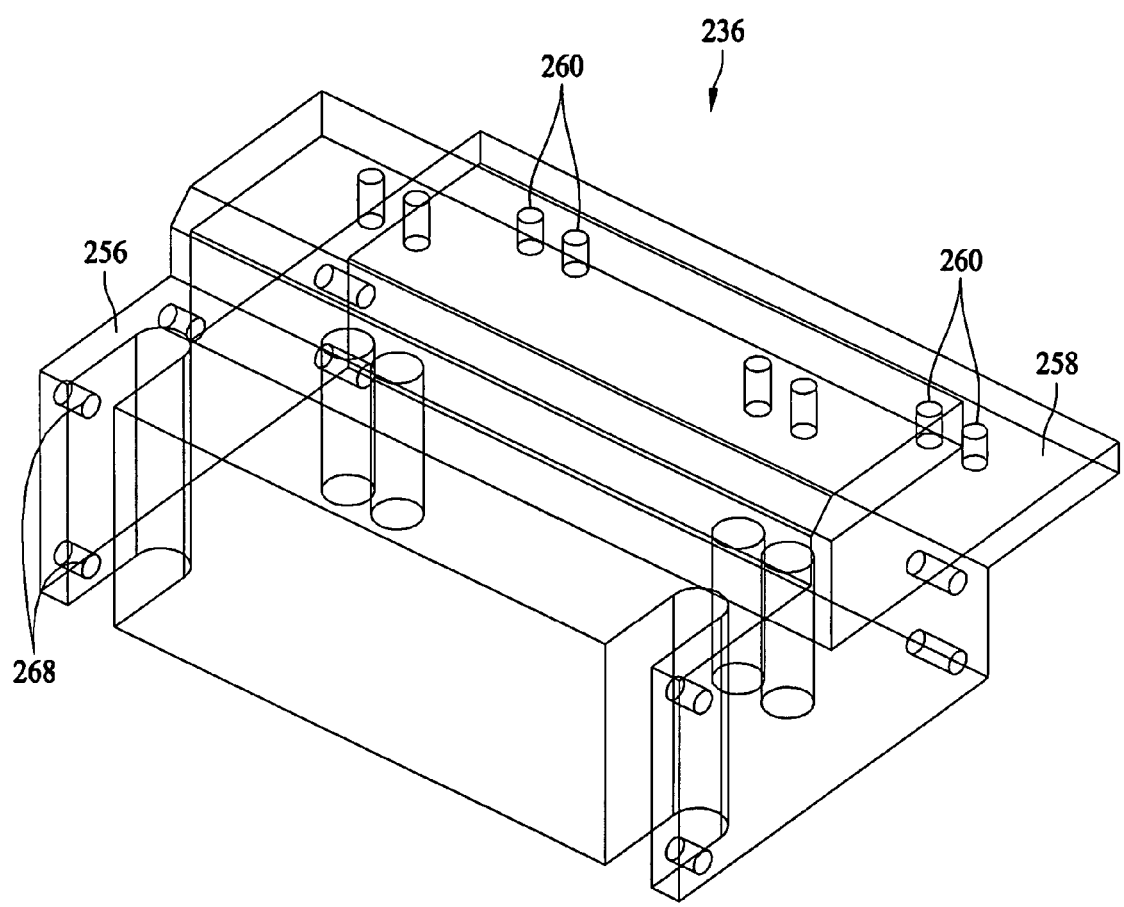
FIG. 14 is a perspective view of an exemplary embodiment of a tool of the exemplary assembly shown in FIG. 5.

FIG. 14 is a perspective view of the exemplary embodiment of tool 236. Tool 236 includes a body 256 having a surface 258 for coupling upper retaining member 238 (FIG. 12), die 240 (FIG. 11), and lower retaining member 242 (FIG. 12) thereto. Upper retaining member 238, die 240, and lower retaining member 242 may couple to tool 236 in any suitable manner, fashion, arrangement, and/or configuration. In the exemplary embodiment, tool 236 includes a plurality of holes 260 for receiving fasteners 262 (shown in FIG. 5) for fixedly securing upper retaining member 238, die 240, and lower retaining member 242 to tool 236. In the exemplary embodiment, holes 260 communicate with holes 246 (FIG. 11) within die 240, holes 250 (FIG. 12) within upper retaining member 238, and holes 254 (FIG. 13) within lower retaining member 242 for receiving fasteners 262. Although fasteners 262 may be any type of fasteners, in the exemplary embodiment fasteners 262 are threaded fasteners. In some embodiments, holes 246, holes 250, holes 254, and/or holes 260 are threaded for threaded connection to fasteners 262. In some embodiments, each of fasteners 262 are thread ably connected to a nut (not shown) for coupling upper retaining member 238, die 240, and lower retaining member 242 to tool 236. When die 240 is coupled to tool 236, die 240, and therefore surface 244 (FIG. 11), is fixed secured (e.g., fixed in location) with respect to tool 236.

Figure 15:
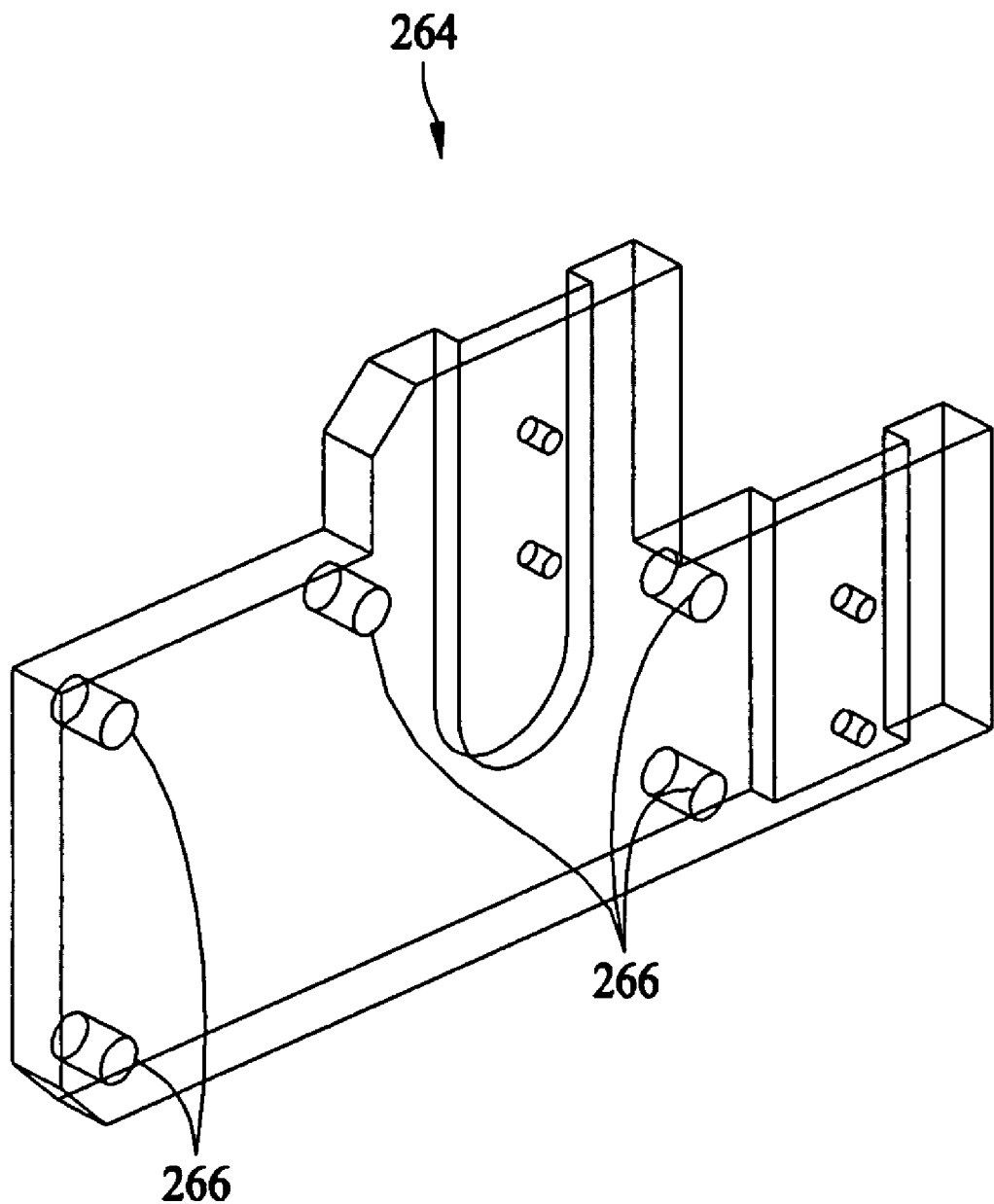
FIG. 15 is a perspective view of an exemplary embodiment of an end plate of the exemplary assembly shown in FIG. 5.

Tool 236 may also include one or more end plates 264 coupled to tool 236, an exemplary embodiment of which is shown in FIGS. 5 and 15. End plates 264 may couple to tool 236 in any suitable manner, fashion, arrangement, and/or configuration. In the exemplary embodiment, each end plate 264 includes a plurality of holes 266 for receiving fasteners (not shown) for fixedly securing end plates 264 on tool 236. Holes 266 may communicate with a plurality of holes 268 (FIG. 14) within tool 236 for receiving the same fasteners as holes 268 for coupling end plates 264 to tool 236. Although the fasteners may be any type of fasteners, in the exemplary embodiment the fasteners are threaded fasteners. In some embodiments, holes 266 and/or holes 268 are threaded for threaded connection to the fasteners. In some embodiments, each of the fasteners is thread ably connected to a nut (not shown) for coupling end plates 264 to tool 236.

Referring again to FIG. 14, tool 236 may be coupled to an actuator (not shown) for moving tool 236 to impart predetermined bend 132 into strands 120 (FIG. 4), as will be described in more detail below. Although the actuator may move tool 236 in any suitable fashion, manner, and/or by any means, in some embodiments tool 236 is moved using hydraulic power, pneumatic power, and/or electrical power.

In operation, and referring again to FIG. 5, tools 202 and 236 are aligned along an axis of motion 270 such that tools 202 and 236, and therefore die 206 and 240, generally oppose one another. In the exemplary embodiment, axis 270 extends through both dies 206 and 240 when tools 202 and 236 are aligned with axis 270 and dies 206 and 240 are coupled to tools 202 and 236, respectively. In some embodiments, axis 270 does not extend through dies 206 and/or 240 when tools 202 and/or 236 are aligned with axis 270 and dies 206 and/or 240 are coupled to tools 202 and/or 236, respectively. As discussed above, when dies 206 and 240 are coupled to tools 202 and 236, respectively, dies 206 and 240, and therefore surfaces 210 and 244, are fixedly secured (e.g., fixed in location) with respect to tools 202 and 236, respectively. Accordingly, when dies 206 and 240 are coupled to tools 202 and 236, respectively, and tools 202 and 236 are aligned with axis 270, dies 206 and 240, and therefore surfaces 210 and 244, are fixedly secured (e.g., fixed in location) with respect to a distance from axis 270. The fixed locations of surfaces 210 and 244 correspond to locations of predetermined bends 134 and 132, respectively, along a strand 120.

A strand 120 is positioned at least partially between tools 202 and 236, and more specifically at least partially between dies 206 and 240, and even more specifically, at least partially between surfaces 210 and 244 of dies 206 and 240, respectively. Tools 202 and 236 are then moved relative to, and towards, one another along axis 270 using the actuators (not shown). In some embodiments, both tools 202 and 236 are moved along axis 270. In some embodiments, only one of tools 202 and 236 is moved along axis 270. As shown in FIG. 16, as tools 202 (FIG. 5) and 236 (FIG. 5) are moved toward one another along axis 270, strand 120 is pressed against surface 210 of die 206 and surface 244 of die 240. As strand 120 is pressed against surface 210, surface 210 imparts predetermined bend 134 in strand 120 at a predetermined location, angle, and length of predetermined bend 134. As strand 120 is pressed against surface 244, surface 244 imparts predetermined bend 132 in strand 120 at a predetermined location, angle, and length of predetermined bend 132. Referring again to FIG. 5, as tools 202 and 236 are moved towards one another along axis 270 extensions 214 and 248 of upper retaining members 204 and 238, respectively, and extensions 218 and 252 of lower retaining members 208 and 242, respectively, facilitate maintaining strand 120 at least partially between dies 206 and 240, and more specifically surfaces 210 and 244.

As discussed above, surfaces 210 and 244 are sized, shaped, and located on dies 206 and 240, respectively, to impart predetermined bends 134 and 132, respectively, in strands 120 when dies 206 and 240 are coupled to tools 202 and 236, respectively. However, assembly 200 may be used to impart other bends (not shown, e.g. Bends having other locations, angles, and/or lengths) on strands 120 or other strands of material to, for example, fabricate different stator bars or fabricate different strands 120 that form a single stator bar. Dies 206 and 240 can be removed from assembly 200 and replaced with similar dies (not shown) that include surfaces (not shown) that are sized, shaped, and located to impart such other bends. Accordingly, to fabricate strands 120 having different bends than other strands, only the dies of assembly 200 need to be changed, possibly eliminating a need for accurate placement of shims, spacers, or other means that properly locate surfaces imparting the bends and that may be time-consuming and subject to operator error. Assembly 200 may therefore increase a reliability and/or repeatability of the finished stator bars as well as decrease a cycle time between different stator bars, and therefore increase an overall production rate of finished stator bars.

Although the methods and assemblies described and/or illustrated herein are described and/or illustrated with respect to electrical power generators, and more specifically stator bars for electrical power generators, practice of the methods and assemblies described and/or illustrated herein is not limited to stator bars nor electrical power generators generally. Moreover, although the methods and assemblies described and/or illustrated herein are described and/or illustrated with respect to bending a strand of copper conductor, practice of the methods and assemblies described and/or illustrated herein is not limited to bending strands of copper conductor. Rather, the methods and systems described and/or illustrated herein are applicable to bending strands of any material for use with anything.

Exemplary embodiments of methods and assemblies are described and/or illustrated herein in detail. The methods and assemblies are not limited to the specific embodiments described herein, but rather, components of each assembly and steps of each method may be utilized independently and separately from other components and steps described herein. Each assembly component and method step can also be used in combination with other assembly components and/or method steps.

When introducing elements/components/etc. Of the methods and assemblies described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. Other than the listed element(s)/component(s)/etc.

While the methods and assemblies described herein have been described and/or illustrated in terms of various specific embodiments, those skilled in the art will recognize that the methods and assemblies described and/or illustrated herein can be practiced with modification within the spirit and scope of the claims.

What is claimed is:

1. A method for bending strands of material, said method comprising:
   providing a first pair of opposing dies each comprising a first surface corresponding to a first pair of predetermined bends to be formed in a first strand of material;
   positioning the first strand of material at least partially between the first pair of opposing dies;
   moving each die of the first pair of opposing dies towards one another to impart the first pair of predetermined bends in the first strand of material;
   providing a second pair of opposing dies each comprising a second surface corresponding to a second pair of predetermined bends to be formed in a second strand of material;
   positioning the second strand of material at least partially between the second pair of opposing dies; and
   moving each die of the second pair of opposing dies towards one another to impart the second pair of predetermined bends in the second strand of material.

2. A method in accordance with claim 1 wherein said providing a first pair of opposing dies comprises coupling the first pair of opposing dies to a pair of tools.

3. A method in accordance with claim 1 wherein said providing a second pair of opposing dies comprises removing the first pair of opposing dies from the pair of tools and coupling the second pair of opposing dies to the pair of tools.

4. A method in accordance with claim 1 wherein said moving each die of the first pair of opposing dies towards one another comprises moving the first surfaces of the first pair of opposing dies towards one another.

5. A method in accordance with claim 1 wherein said moving each die of the second pair of opposing dies towards one another comprises moving the second surfaces of the second pair of opposing dies towards one another.

6. An assembly for bending a strand of material, said assembly comprising a first tool and a second tool, said first tool comprising a first pair of dies coupled to said first tool, said first pair of dies comprising a first surface corresponding to a first predetermined bend to be formed in the strand of material, said first surface fixedly secured with respect to said first tool, said second tool comprising a second pair of dies coupled to said second tool, said second pair of dies comprising a second surface corresponding to a second predetermined bend to be formed in the strand of material, said second surface fixedly secured with respect to said second tool, said first surface configured to impart the first predetermined bend in the strand of material and said second surface configured to impart the second predetermined bend in the strand of material when the strand of material is positioned at least partially between said first and second surfaces and when each of said first pair of dies and each of said second pair of dies are moved towards one another along an axis of motion.

7. An assembly in accordance with claim 6 wherein the strand of material comprises a strand of copper conductor, said first surface is configured to impart the first predetermined bend in the strand of copper conductor, and said second surface is configured to impart the second predetermined bend in the strand of copper conductor.

8. An assembly in accordance with claim 6 wherein said first surface is oriented at an angle and has a length corresponding to the first predetermined bend to be formed in the strand of material, and said second surface is oriented an angle and has a length corresponding to the second predetermined bend to be formed in the strand of material.

9. An assembly in accordance with claim 6 wherein the axis of motion extends through said first and second dies.

10. An assembly in accordance with claim 6 wherein said first die is identically shaped to said second die.

11. An assembly in accordance with claim 6 further comprising:
    first and second upper retaining members coupled to said first and second tools, respectively; and
    first and second lower retaining members coupled to said first and second tools, respectively, wherein said first die is coupled to said first tool at least partially between said first upper retaining member and said first lower retaining member, and said second die is coupled to said second tool at least partially between said second upper retaining member and said second lower retaining member.

12. An assembly in accordance with claim 11 wherein said first and second lower retaining members each comprise an extension that facilitates maintaining the strand of material in position at least partially between said first and second surfaces.

13. An assembly in accordance with claim 11 wherein said first and second upper retaining members each comprise an extension that facilitates maintaining the strand of material in position at least partially between said first and second surfaces.

14. An assembly in accordance with claim 6 wherein at least one of said first and second tools is movable via at least one of electrical power, pneumatic power, and hydraulic power.

15. An assembly for bending a strand of material, said assembly comprising a first tool and a second tool, said first tool comprising a first pair of dies coupled to said first tool, said first pair of dies comprising a first surface corresponding to a first predetermined bend to be formed in the strand of material, said first surface fixedly secured with respect to a distance from an axis of motion of said first and second tools, said second tool aligned with said first tool along the axis of motion, said second tool comprising a second pair of dies coupled said second tool, said second pair of dies comprising a second surface corresponding to a second predetermined bend to be formed in the strand of material, said second surface fixedly secured with respect to the axis of motion, said first surface configured to impart the first predetermined bend in the strand of material and said second surface configured to impart the second predetermined bend in the strand of material when the strand of material is positioned at least partially between said first and second surfaces and when each of said first pair of dies and each of said second pair of dies are moved towards one another along the axis of motion.

16. An assembly in accordance with claim 15 wherein the strand of material comprises a strand of copper conductor, said first surface is configured to impart the first predetermined bend in the strand of copper conductor, and said second surface is configured to impart the second predetermined bend in the strand of copper conductor.

17. An assembly in accordance with claim 15 wherein the axis of motion extends through said first and second dies.

18. An assembly in accordance with claim 15 further comprising:
    first and second upper retaining members coupled to said first and second tools, respectively; and
    first and second lower retaining members coupled to said first and second tools, respectively, wherein said first die is coupled to said first tool at least partially between said first upper retaining member and said first lower retaining member, and said second die is coupled to said second tool at least partially between said second upper retaining member and said second lower retaining member.

19. An assembly in accordance with claim 15 wherein at least one of said first and second tools is movable via at least one of electrical power, pneumatic power, and hydraulic power.

20. An assembly in accordance with claim 15 wherein said first die is identical to said second die.

* * * * *